US005495270A

United States Patent [19]

Burr et al.

[11] Patent Number: 5,495,270

[45] Date of Patent: Feb. 27, 1996

[54] METHOD AND APPARATUS FOR PRODUCING DOT SIZE MODULATED INK JET PRINTING

[75] Inventors: Ronald F. Burr; David A. Tence, both of Wilsonville; Hue P. Le, Beaverton; Ronald L. Adams, Newberg; Jon C. Mutton, Portland, all of Oreg.

[73] Assignee: Tektronix, Inc., Wilsonville, Oreg.

[21] Appl. No.: 100,504

[22] Filed: Jul. 30, 1993

[51] Int. Cl.$^{6}$ .............................. B41J 2/045; G01D 15/16

[52] U.S. Cl. .............................. 347/10; 347/15; 347/68; 347/70

[58] Field of Search .............................. 347/15, 10, 68, 347/70

[56] References Cited

U.S. PATENT DOCUMENTS

| | | | |
|---|---|---|---|
| 3,946,398 | 3/1976 | Kyser et al. | 346/1 |
| 4,393,384 | 7/1983 | Kyser | 346/1.1 |
| 4,503,444 | 3/1985 | Tacklind | 346/140 R |
| 4,513,299 | 4/1985 | Lee et al. | 346/140 R |
| 4,563,689 | 1/1986 | Murakami et al. | 346/1.1 |
| 4,639,735 | 1/1987 | Yamamoto et al. | 346/1.1 |
| 4,730,197 | 3/1988 | Raman et al. | 346/140 R |
| 4,746,935 | 5/1988 | Allen | 346/140 R |
| 5,124,716 | 6/1992 | Roy et al. | 346/1.1 |
| 5,170,177 | 12/1992 | Stanley et al. | 346/1.1 |
| 5,381,162 | 1/1995 | Roy et al. | 347/10 |

FOREIGN PATENT DOCUMENTS

| | | | |
|---|---|---|---|
| 541129A1 | 5/1993 | European Pat. Off. | 347/10 |

OTHER PUBLICATIONS

"Spot–Size Modulation in Drop–On–Demand Ink–Jet Technology," E. P. Hofer, Society for Information Display Digest, 1985, pp. 321, 322.

"Physical Limitations on High Performance Piezo–Electric Pusher Technology", Stuart Howkins, SPIE vol. 1912 Color Hard Copy and Graphic Arts II (1993), pp. 142–152.

*Primary Examiner*—Benjamin R. Fuller
*Assistant Examiner*—Raquel Yvette Gordon
*Attorney, Agent, or Firm*—Ralph D'Alessandro; Richard B. Preiss

[57] ABSTRACT

An ink jet (10) apparatus and method provides high-resolution gray scale printing by providing multiple PZT drive waveforms (100, 110, 120), each having a spectral energy distribution that excites a different modal resonance of ink in an ink jet print head orifice (14). By selecting the particular drive waveform that concentrates spectral energy at frequencies associated with a desired oscillation mode and that suppresses energy at the other oscillation modes, an ink drop (170, 180, 190) is ejected that has a diameter proportional to a center excursion size of the selected meniscus surface oscillation mode. The center excursion size of high order oscillation modes is substantially smaller than the orifice diameter, thereby causing ejection of ink drops smaller than the orifice diameter. Conventional orifice manufacturing techniques may be used because a specific orifice diameter is not required. Jetting reliability and contaminant susceptibility are, thereby, improved by eliminating the need for an unconventionally small orifice. Changing a selected PZT drive waveform amplitude changes drop ejection velocity without changing drop volume. This invention, therefore, provides for selection of ejected ink drop volumes having substantially the same ejection velocity over a wide range of ejection repetition rates.

35 Claims, 10 Drawing Sheets

METHOD AND APPARATUS FOR PRODUCING DOT SIZE MODULATED INK JET PRINTING

TECHNICAL FIELD

This invention relates to ink jet printing and more particularly to a method and an apparatus for ejecting ink drops of differing volumes from an ink jet print head.

BACKGROUND OF THE INVENTION

Prior drop-on-demand ink jet print heads typically eject ink drops of a single volume that produce on a print medium dots of ink sized to provide "solid fill" printing at a given resolution, such as 12 dots per millimeter. Single dot size printing is acceptable for most text and graphics printing applications not requiring "photographic" image quality. Photographic image quality normally requires a combination of high dot-resolution and an ability to modulate a reflectance (i.e. gray scale) of dots forming the image.

In single dot size printing, average reflectance of a region of an image is typically modulated by a process referred to as "dithering" in which the perceived intensity of an array of dots is modulated by selectively printing the array at a predetermined dot density. For example, if a 50 percent local average reflectance is desired, half of the dots in the array are printed. A "checker-board" pattern provides the most uniform appearing 50 percent local average reflectance. Multiple dither pattern dot densities are possible to provide a wide range of reflectance levels. For a two-by-two dot array, four reflectance level patterns are possible. An eight-by-eight dot array can produce 256 reflectance levels. An usable gray scale image is achieved by distributing a myriad of appropriately dithered arrays across a print medium in a predetermined arrangement.

However, with dithering, there is a trade-off between the number of possible reflectance levels and the dot array area required to achieve those levels. Eight-by-eight dot array dithering in a printer having 12 dot per millimeter (300 dots per inch) resolution results in an effective gray scale resolution as low as 1.5 dots per millimeter (75 dots per inch). Gray scale images printed with such dither array patterns, however, suffer from image quality.

An alternative to dithering is ink dot size modulation that entails controlling the volume of each drop of ink ejected by the ink jet head. Ink dot size modulation (hereafter referred to as "gray scale printing") maintains full printer resolution by eliminating the need for dithering. Moreover, gray scale printing provides greater effective printing resolution. For example, an image printed with two dot sizes at 12 dots per millimeter (300 dots per inch) resolution may have a better appearance than the same image printed with one dot size at 24 dots per millimeter (600 dots per inch) resolution with a two-dot dither array.

There are previously known apparatus and methods for modulating the volume of ink drops ejected from an ink jet print head. U.S. Pat. No. 3,946,398, issued Mar. 23, 1976 for a METHOD AND APPARATUS FOR RECORDING WITH WRITING FLUIDS AND DROP PROJECTION MEANS THEREFORE describes a variable drop volume drop-on-demand ink jet head that ejects ink drops in response to pressure pulses developed in an ink pressure chamber by a piezoceramic transducer (hereafter referred to as a "PZT"). Drop volume modulation entails varying an amount of electrical waveform energy applied to the PZT for the generation of each pressure pulse. However, it is noted that varying the drop volume also varies the drop ejection velocity which causes in drop landing position errors. Constant drop volume, therefore, is taught as a way of maintaining image quality. Moreover, the drop ejection rate is limited to about 3000 drops per second, a rate that is slow compared to typical printing speed requirements.

U.S. Pat. No. 4,393,384, issued Jul. 12, 1983 for an INK PRINTHEAD DROPLET EJECTING TECHNIQUE describes an improved PZT drive waveform that produces pressure pulses which are timed to interact with an ink meniscus positioned in an ink jet orifice to modulate ink drop volume. The drive waveform is shaped to avoid ink meniscus and print head resonances, and to prevent excessive negative pressure excursions, thereby achieving a higher drop ejection rate, a faster drop ejection velocity, and improved drop landing position accuracy. The technique provides independent control of drop volume and ejection velocity.

However, this droplet ejection technique only provides ink drops having a diameter equal to or larger than the orifice diameter. An orifice diameter ink drop flattens upon impacting a print medium, producing a dot larger than the orifice diameter. Solid fill printing entails ejecting a continuous stream of the largest volume ink drops tangentially spaced apart at the resolution of the printer. Therefore, in a 12 dot per millimeter resolution printer, the largest dots must be about 118 microns in diameter. If gray scale printing is required, smaller dots are required that are limited to a diameter somewhat larger than the orifice diameter. Clearly, an orifice diameter approaching 25 microns is required, but this is a diameter that is impractical to manufacture and which clogs easily.

U.S. Pat. No. 5,124,716, issued Jun. 23, 1992 for a METHOD AND APPARATUS FOR PRINTING WITH INK DROPS OF VARYING SIZES USING A DROP-ON-DEMAND INK JET PRINT HEAD, assigned to the assignee of the present invention, and U.S. Pat. No. 4,639,735, issued Jan. 27, 1987 for APPARATUS FOR DRIVING LIQUID JET HEAD describe circuits and PZT drive waveforms suitable for ejecting ink drops smaller than an ink jet orifice diameter. However, each ink drop has an ejection velocity proportional to its volume which, unfortunately, can cause drop landing position errors.

Ink drop ejection velocity compensation is described in copending U.S. Pat. application Ser. No. 07/892494 of Roy et al., filed Jun. 3, 1992 for METHOD AND APPARATUS FOR PRINTING WITH A DROP-ON-DEMAND INK-JET PRINT HEAD USING AN ELECTRIC FIELD and assigned to the assignee of the present invention. A time invariant electric field accelerates the ink drops in inverse proportion to their volumes, thereby reducing the effect of ejection velocity differences. In another aspect of electric field operation, a PZT is driven with a waveform sufficient to cause an ink meniscus to bulge from the orifice, but insufficient to cause drop ejection. The electric field attracts a fine filament of ink from the bulging meniscus to form an ink drop smaller than the orifice diameter. Unfortunately, the electric field adds complexity, cost, potential danger, dust attraction, and unreliability to a printer.

And yet another approach to modulating drop volume is disclosed in U.S. Pat. No. 4,746,935, issued May 24, 1988 for a MULTITONE INK JET PRINTER AND METHOD OF OPERATION. This describes an ink jet print head having multiple orifice sizes, each optimized to eject a particular drop volume. Of course, such a printhead is significantly more complex than a single orifice size print head having at least two times the number of jets, and still requires a very small orifice to produce the smallest drop volume.

U.S. Pat. No. 4,503,444, issued Mar. 5, 1985 for a METHOD AND APPARATUS FOR GENERATING A GRAY SCALE WITH A HIGH SPEED THERMAL INK JET PRINTER, U.S. Pat. No. 4,513,299, issued Apr. 23, 1985 for SPOT SIZE MODULATION USING MULTIPLE PULSE RESONANCE DROP EJECTION, and "Spot-Size Modulation in Drop-On-Demand Ink-Jet Technology," E. P. Hofer, SID Digest, 1985, pp. 321, 322, each describe using a multi-pulse PZT drive waveform to eject a predetermined number of small ink drops that merge during flight to form a single larger ink drop. This technique has the advantage of constant drop ejection velocity, but inherently forms drops much larger than the ink jet head orifice diameter.

Clearly, the physical laws governing ink jet drop formation and ejection are complexly interactive. Therefore, U.S. Pat. No. 4,730,197, issued Mar. 8, 1988 for an IMPULSE INK JET SYSTEM describes and characterizes numerous interactions among ink jet geometric features, PZT drive waveforms, meniscus resonance, pressure chamber resonance, and ink drop ejection characteristics. In particular, in a multiple-orifice print head, cross-talk among the jets affects ink drop volume uniformity, so "dummy channels" and compliant chamber walls are provided to minimize the effects of cross-talk. Drop ejection rates of 10 kilohertz are achieved with PZT drive waveform compensation techniques that account for print head and fluidic resonances. However, this reference strives to achieve uniform drop volume so that the resulting drop diameter is about the same as the orifice diameter. There is no recognition of ink drop volume modulation in the patent, and the patent is not addressed to gray scale printing.

U.S. Pat. No. 5,170,177, issued Dec. 8, 1992 for a METHOD OF OPERATING AN INK JET TO ACHIEVE HIGH PRINT QUALITY AND HIGH PRINT RATE, assigned to the assignee of the present invention, describes PZT drive waveforms having a spectral energy distribution that is minimized at dominant ink jet head resonant frequencies. A constant ink drop volume and ejection velocity are thereby achieved over a wide range of drop repetition rates. However, similar to the teaching of U.S. Pat. No. 4,730,197, uniform and optimum ink drop volume is sought, and the resulting drop diameter is about the same as the orifice diameter. Again, there is no recognition of ink drop volume modulation nor is attention given to gray scale printing.

What is needed, therefore, is a simple and inexpensive ink jet print head system that provides high-resolution gray scale printing without sacrificing performance. This need is met by the design and method of the present invention.

SUMMARY OF THE INVENTION

An object of this invention is, therefore, to provide a gray scale ink jet printing method for producing ink drops at a high repetition rate which have a controllable size that can be smaller than the orifice size.

Another object of this invention is to provide a method of driving a conventional ink jet head to improve its performance and the resolution of the output product.

A further object of this invention is to provide an apparatus and a method for obtaining small ink jet orifice performance from a reliable and simple to manufacture large ink jet orifice.

Still another object of this invention is to provide a high resolution gray scale ink jet printing apparatus and method that does not require dithering, electric fields, or multiple jet and/or orifice sizes.

An ink jet apparatus and method according to this invention provides high-resolution gray scale printing by providing multiple PZT drive waveforms, each having a spectral energy distribution that excites a different modal resonance of ink in an ink jet print head orifice. By selecting the particular drive waveform that concentrates spectral energy at frequencies associated with a desired oscillation mode and that avoids extraneous or parasitic frequencies that compete with the desired mode to suppress energy at other oscillation modes, an ink drop is ejected that has a diameter proportional to a center excursion size of the selected meniscus surface oscillation mode. The center excursion size of high order oscillation modes is substantially smaller than the orifice diameter, thereby causing ejection of ink drops smaller than the orifice diameter. Conventional orifice manufacturing techniques may be used because a specific orifice diameter is not required. It is an advantage that jetting reliability is improved by eliminating the need for an unconventionally small orifice, as well as reducing the potential for contaminants plugging the ink jet orifice.

It is another advantage that the invention provides for selection of ejected ink drop volumes that may have substantially the same ejection velocity over a wide range of ejection repetition rates.

Additional objects and advantages of this invention will be apparent from the following detailed description of a preferred embodiment thereof which proceeds with reference to the accompanying drawings.

DETAILED DESCRIPTION OF PREFERRED EMBODIMENT

Figure 1:
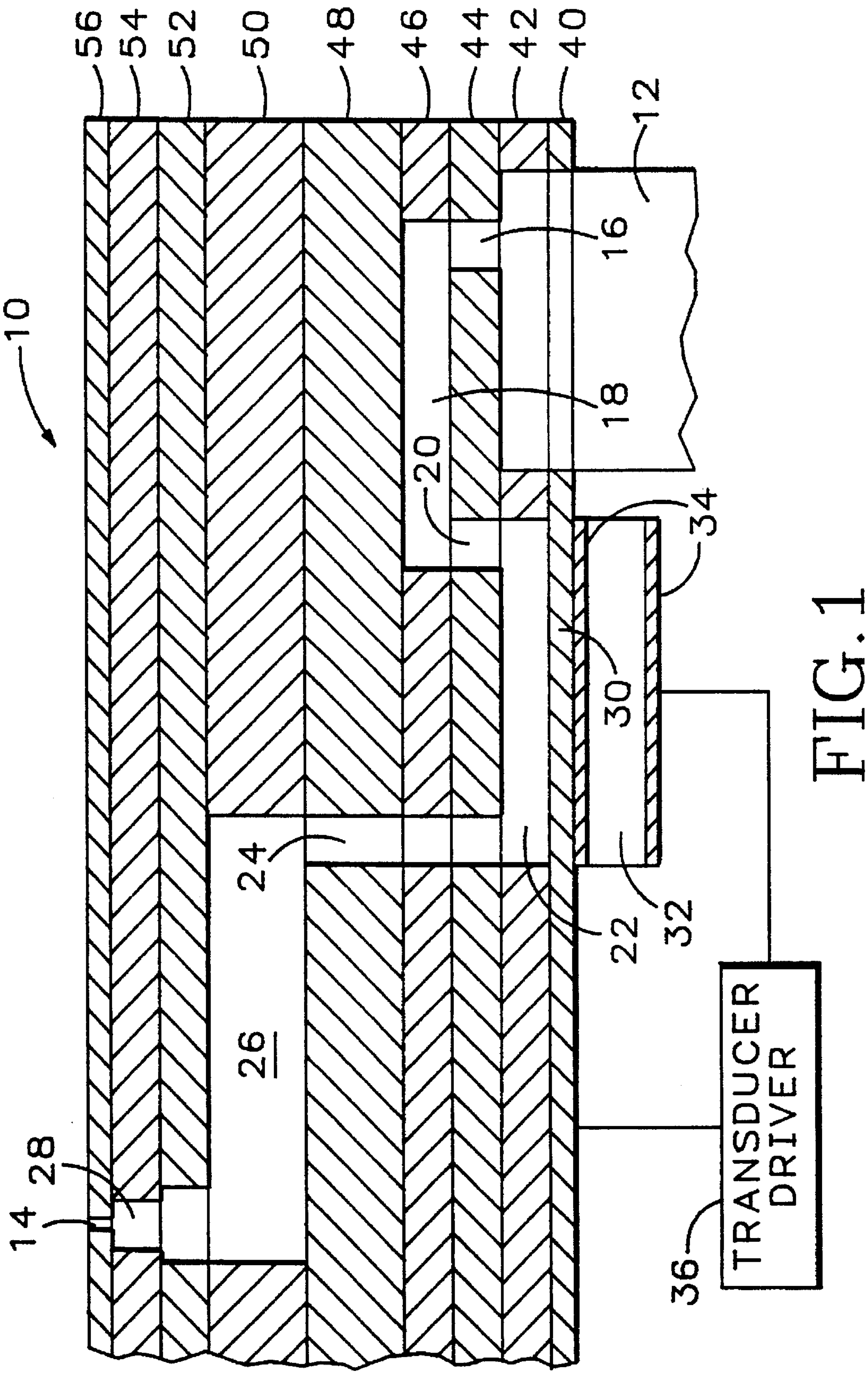
FIG. 1 is a diagrammatical cross-sectional view of a PZT driven ink jet like one found in a typical ink jet array print head type used with this invention.

FIG. 1 shows a cross-sectional view of an ink jet 10 which is part of a multiple-orifice ink jet print head suitable for use with the invention. Ink jet 10 has a body that defines an ink manifold 12 through which ink is delivered to the ink jet print head. The body also defines an ink drop forming orifice 14 together with an ink flow path from ink manifold 12 to orifice 14. In general, the ink jet print head preferably includes an array of orifices 14 that are closely spaced from one another for use in printing drops of ink onto a print medium (not shown).

A typical ink jet print head has at least four manifolds for receiving, black, cyan, magenta, and yellow ink for use in black plus subtractive three-color printing. However, the number of such manifolds may be varied depending upon whether a printer is designed to print solely in black ink or with less than a full range of color. Ink flows from manifold 12, through an inlet port 16, an inlet channel 18, a pressure chamber port 20, and into an ink pressure chamber 22. Ink leaves pressure chamber 22 by way of an offset channel port 24, flows through an optional offset channel 26 and an outlet channel 28 to nozzle 14, from which ink drops are ejected. Omission of offset channel 26 may improve jetting performance.

Ink pressure chamber 22 is bounded on one side by a flexible diaphragm 34. An electromechanical transducer 32, such as a PZT, is secured to diaphragm 30 by an appropriate adhesive and overlays ink pressure chamber 22. In a conventional manner, transducer 32 has metal film layers 34 to which an electronic transducer driver is electrically connected. Although other forms of transducers may be used, transducer 32 is operated in its bending mode such that when a voltage is applied across metal film layers 34, transducer 32 attempts to change its dimensions. However, because it is securely and rigidly attached to the diaphragm, transducer 32 bends, deforming diaphragm 30, and thereby displacing ink in ink pressure chamber 22, causing the outward flow of ink through passage 26 to nozzle 14. Refill of ink pressure chamber 22 following the ejection of an ink drop is augmented by reverse bending of transducer 34 and the concomitant movement of diaphragm 30.

To facilitate manufacture of the ink jet print head usable with the present invention, ink jet 10 is preferably formed of multiple laminated plates or sheets, such as of stainless steel. These sheets are stacked in a superimposed relationship. In the illustrated FIG. 1 embodiment of the present invention, these sheets or plates include a diaphragm plate 40, that forms diaphragm 30 and portion of manifold 12; an ink pressure chamber plate 42, that defines ink pressure chamber 22 and a portion of manifold 12; a separator plate 44, that defines inlet port 16 and pressure chamber port 20, bounds one side of ink pressure chamber 22, and defines a portion of outlet channel port 24; an inlet channel plate 46, that defines inlet channel 18, and a portion of outlet channel port 24; another separator plate 48, that defines a portion of outlet channel port 24; an offset channel plate 50 that defines offset channel 26; a separator plate 52, that defines a portion of outlet channel 28; an outlet plate 54, that defines a portion of outlet channel 28; and an orifice plate 56, that defines orifice 14 of the ink jet.

More or fewer plates than those illustrated may be used to define the various ink flow passageways, manifolds, and pressure chambers of the ink jet print head. For example, multiple plates may be used to define an ink pressure chamber instead of the single plate illustrated in FIG. 1. Also, not all of the various features need be in separate sheets or layers of metal. For example, patterns in the photoresist that are used as templates for chemically etching the metal (if chemical etching is used in manufacturing) could be different on each side of a metal sheet. Thus, as a more specific example, the pattern for the ink inlet passage could be placed on one side of the metal sheet while the pattern for the pressure chamber could be placed on the other side and in registration front-to-back. Thus, with carefully controlled etching, separate ink inlet passage and pressure chamber containing layers could be combined into one common layer.

To minimize fabrication costs, all of the metal layers of the ink jet print head, except orifice plate 56, are designed so that they may be fabricated using relatively inexpensive conventional photo-patterning and etching processes in metal sheet stock. Machining or other metal working processes are not required. Orifice plate 56 has been made successfully using any number of processes, including electroforming with a sulfumate nickel bath, micro-electric discharge machining in three hundred series stainless steel, and punching three hundred series stainless steel, the last two approaches being used in concert with photo-patterning and etching all of the features of orifice plate 56 except the orifices themselves. Another suitable approach is to punch the orifices and use a standard blanking process to form any remaining features in the plate.

Table 1 shows acceptable dimensions for the ink jet of FIG. 1. The actual dimensions employed are a function of the ink jet array and its packaging for a specific application. For example, the orifice diameter of the orifices 14 in orifice plate 56 can vary from about 25 to about 150 microns.

TABLE 1

| Feature | All dimensions in millimeters<br>Length | Width | Height | Cross Section |
|---|---|---|---|---|
| Inlet port | 2.0 | .41 | .41 | Circular |
| Inlet channel | 6.4 | .30 | 2.0 | Rectangular |
| Pressure chamber port | .2 | .41 | .41 | Circular |
| Pressure chamber | .2 | 2.20 | 2.20 | Circular |
| Offset channel port | 1.0 | .41 | .41 | Circular |
| Offset channel | 2.1 | .41 | .81 | Rectangular |
| Outlet separator | .2 | .36 | .36 | Circular |
| Outlet channel | .2 | .25 | .25 | Circular |
| Orifice | .08 | .08 | .08 | Circular |

The electromechanical transducer mechanism selected for the ink jet print heads of the present invention can comprise ceramic disc transducers bonded with epoxy to the diaphragm plate 40, with each of the discs centered over a respective ink pressure chamber 22. For this type of transducer mechanism, a substantially circular shape has the highest electromechanical efficiency, which refers to the volume displacement for a given area of the piezoceramic element.

Ejecting ink drops having controllable volumes from an ink jet head such as that of FIG. 1 entails providing from transducer driver 36, multiple selectable drive waveforms to transducer 32. Transducer 32 responds to the selected waveform by inducing pressure waves in the ink that excite ink fluid flow resonances in orifice 14 and at the ink surface meniscus. A different resonance mode is excited by each selected waveform and a different drop volume is ejected in response to each resonance mode.

Figure 2A:
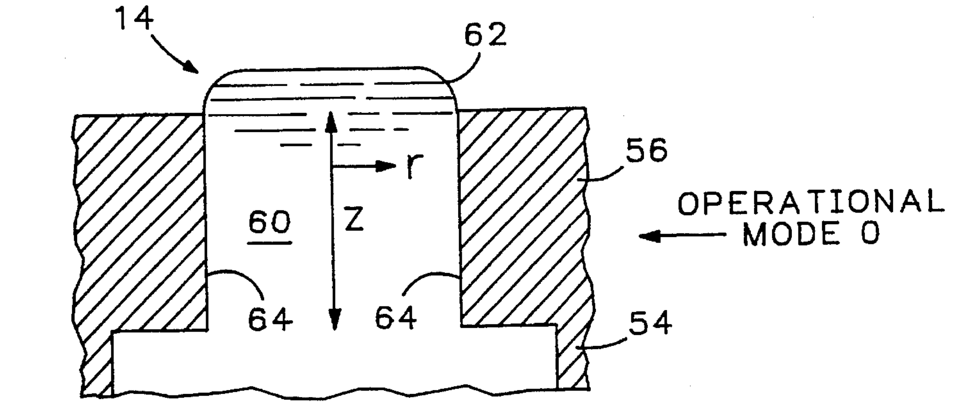
FIGS. 2A, 2B, and 2C are enlarged pictorial cross-sectional views of an orifice portion of the print head of FIG. 1 showing representative orifice fluid flow operational modes zero, one, and two according to this invention.
Figure 2B:
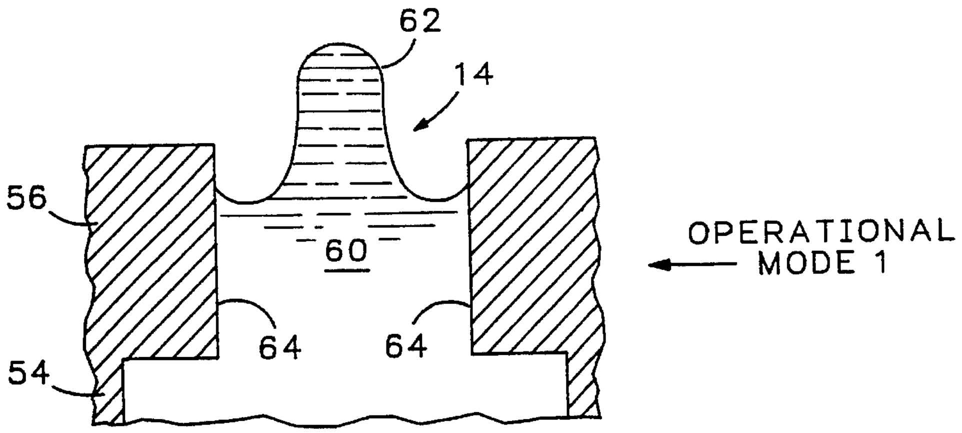
Figure 2C:
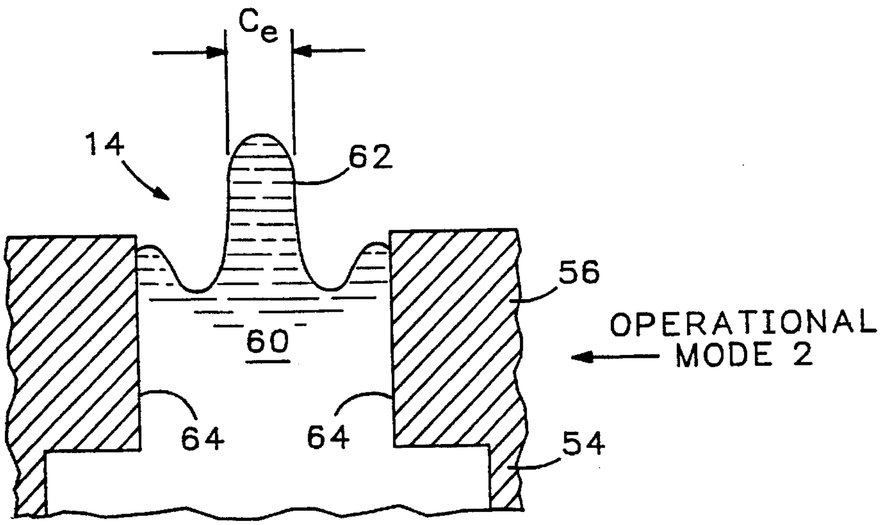

Referring to FIGS. 2A, 2B, and 2C, an ink column 60 having a meniscus 62 is shown positioned in orifice 14. Meniscus 62 is shown excited in three operational modes, referred to respectively as modes zero, one, and two in FIGS. 2A, 2B, and 2C. FIG. 2C shows the center excursion $C_e$ of the meniscus surface of a high order oscillation mode. In the following theoretical description, orifice 14 is assumed to be cylindrical, although the inventive principles apply equally to non-cylindrical orifice shapes.

The particular mode excited in orifice 14 is governed by a combination of the internal orifice flow and meniscus surface dynamics. Because orifice 14 is cylindrical, the internal and meniscus surface dynamics act together to cause meniscus 62 to oscillate in modes described by Bessel function type solutions of the governing fluid dynamic equations.

FIG. 2A shows operational mode zero which corresponds to a bulk forward displacement of ink column 60 within a wall 64 of orifice 14. Prior workers have based ink jet and drive waveform design on mode zero operation. Ink surface tension and viscous boundary layer effects associated with wall 64 cause meniscus 62 to have a characteristic rounded shape indicating the lack of higher order modes. The natural resonant frequency of mode zero is primarily determined by the bulk motion of the ink mass interacting with the compression of the ink inside the ink jet (i.e., like a Helmholtz oscillator). The geometric dimensions of the various fluidically coupled ink jet components, such as the channels 18, 26, and 28, the manifold 12, the part 16, 20, and 22 and the pressure chamber 22, all of FIG. 1, are sized to avoid extraneous or parasitic resonant frequencies that would interact with the orifice resonance modes.

Designing drive waveforms suitable for drop volume modulation, therefore, requires a further knowledge of the natural frequencies of the orifice and meniscus system elements so that a waveform can be designed that concentrates energy at frequencies near the natural frequency of a desired mode and suppresses energy at the natural frequencies of other mode(s) and extraneous or parasitic resonant frequencies which compete with the desired mode for energy. These extraneous or parasitic resonant frequencies adversely affect the ejection of ink droplets from the ink jet orifice in several ways, including, but not limited to, ink drop size and the drop speed or the time it takes the drop to reach the print media once ejected from the orifice, thereby also affecting the accuracy of drop placement on the media.

The ink meniscus surface dynamics are modeled by a fluid pressure flow analysis in a representative orifice. Shown below are the equations governing the fluid dynamics and boundary conditions.

Governing Equation:

$$\frac{1\phi}{r\partial r}\left(r\frac{\partial\phi}{\partial r}\right)+\frac{\partial^2\phi}{\partial z^2}=0$$

Centerline boundary condition:

$$\upsilon|_{r=0}=\frac{\partial\phi}{\partial r}|_{r=0}=0$$

Outside wall boundary condition:

$$\upsilon|_{r=R}=\frac{\partial\phi}{\partial r}|_{r=R}=0$$

Bottom boundary condition:

$$\phi|_{z=0}=0$$

Free surface boundary condition:

$$\left(\frac{\partial^2\phi}{\partial t^2}+\frac{\sigma}{\rho}\left(\frac{1}{r}\frac{\partial}{\partial r}\left(r\frac{\partial}{\partial r}\frac{\partial\phi}{\partial z}\right)\right)\right)_{z=h}=0$$

A solution is obtained by taking a Laplace transform in time and separating the variables in two space dimensions z and r, where z is an axial distance and r is a radial distance within orifice 14. The solution in the radial direction is a Bessel function of the first kind:

$$\Phi=(B_1\sinh(k_nZ)+B_2\cosh(k_nz))J_o(k_nr)$$

Matching the boundary conditions determines the allowable modal oscillation frequencies:

$$\omega^2=\left(\frac{w}{t}\right)^2=\frac{\sigma k_n^3\coth(k_nh)}{\rho R^3}$$

$$\omega_1(h)=\frac{\sqrt{\sigma(k_1)^3\frac{\coth(k_1h)}{\rho R^3}}}{2\pi}$$

$$\omega_2(h)=\frac{\sqrt{\sigma(k_2)^3\frac{\coth(k_2h)}{\rho R^3}}}{2\pi}$$

$$\omega_3(h)=\frac{\sqrt{\sigma(k_3)^3\frac{\coth(k_3h)}{\rho R^3}}}{2\pi}$$

Where: $k_1=3.832$, $k_2=7.016$, $k_3=10.174$, h=0.1 to 2.0 by steps of 0.2, $\sigma=25$, $\rho=0.85$, and R=0.0038 centimeters.

Figure 3:
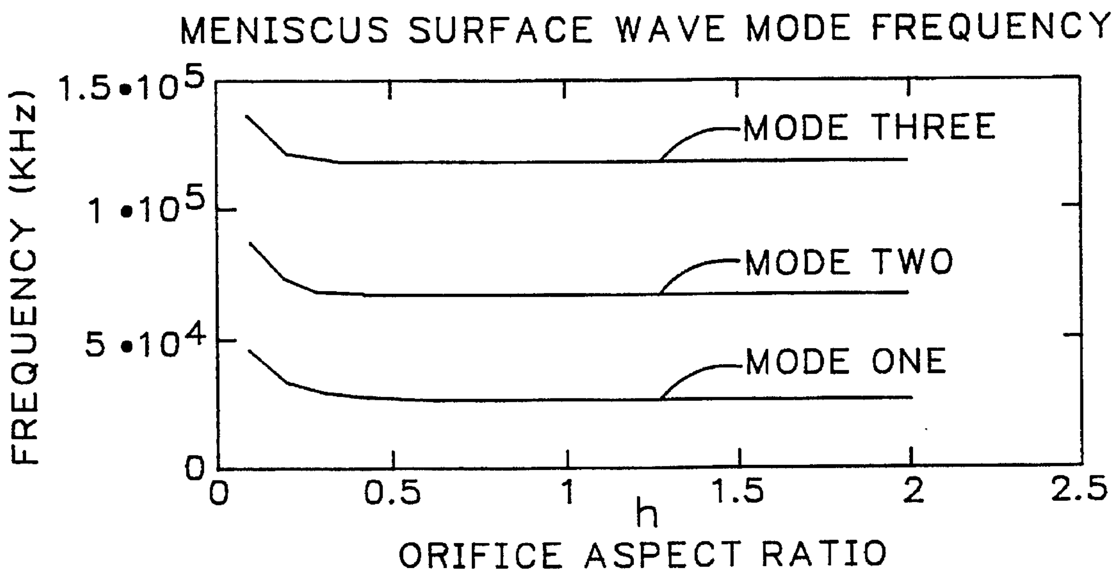
FIG. 3 graphically shows meniscus surface wave mode frequency as a function of orifice aspect ratio.

FIG. 3 graphically shows the calculated mode one, two, and three frequencies for a typical ink jet geometry as a function of orifice aspect ratio. For most orifice aspect ratios the frequencies for modes one, two, and three are respectively about 30, 65, and 120 kilohertz. Mode three is not shown in FIG. 2.

Figure 4:
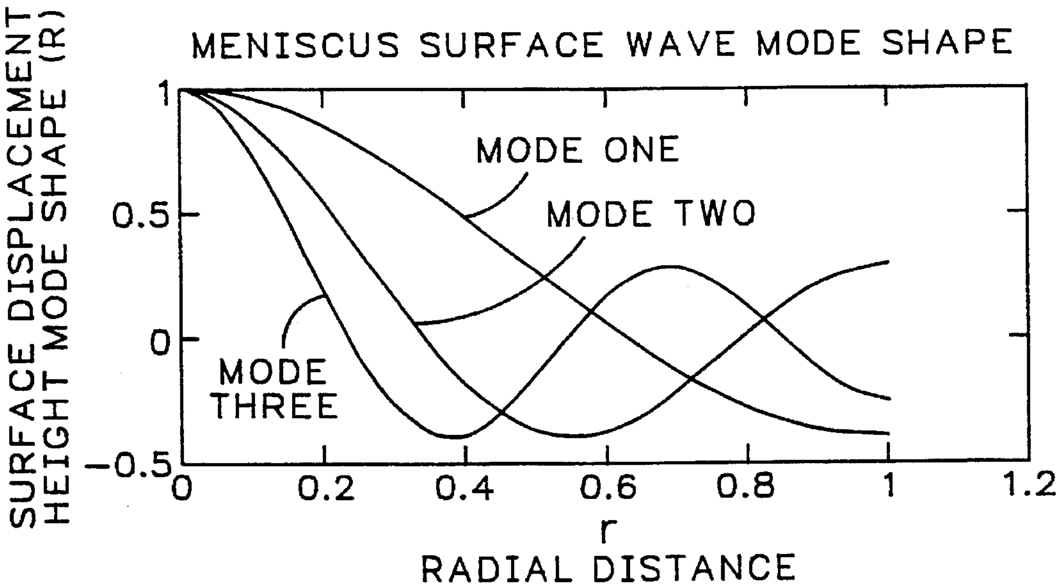
FIG. 4 graphically shows a mathematically modeled meniscus surface wave mode displacement height as a function of orifice radial distance and mode number.
Figure 5A:
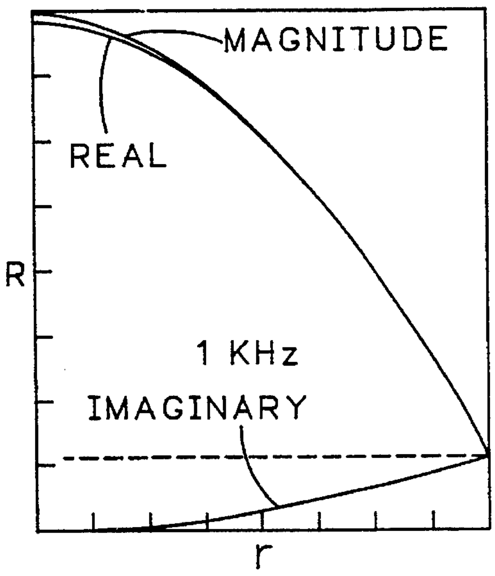
FIGS. 5A–5F graphically show the computed real and imaginary components of internal inertial and viscous orifice velocity mode shapes plotted for respective 1, 10, 20, 35, 50, and 100 kiloHertz excitation frequencies.
Figure 5B:
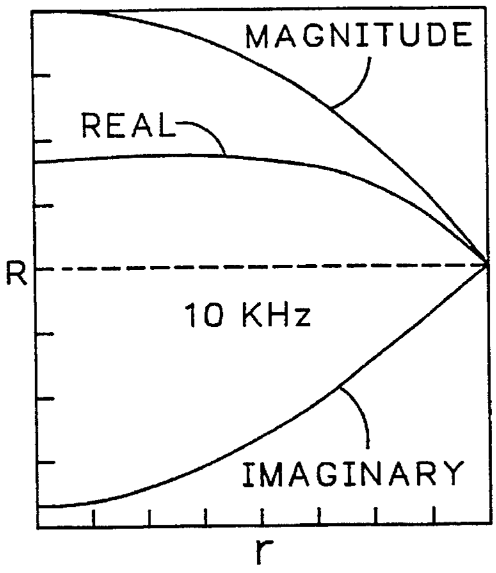
Figure 5C:
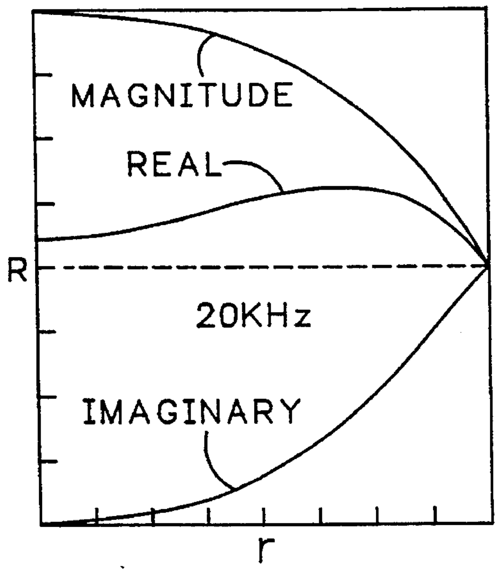
Figure 5D:
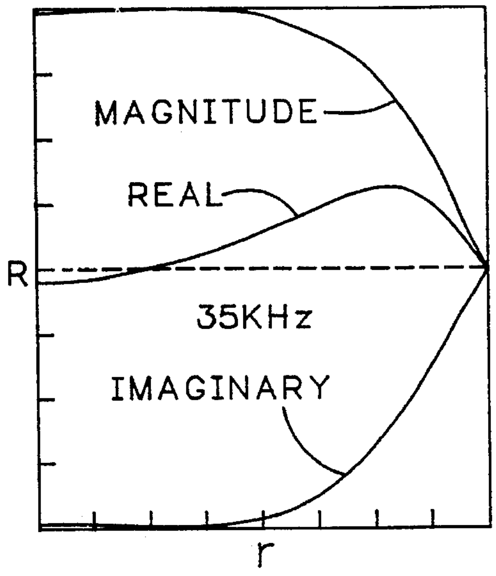
Figure 5E:
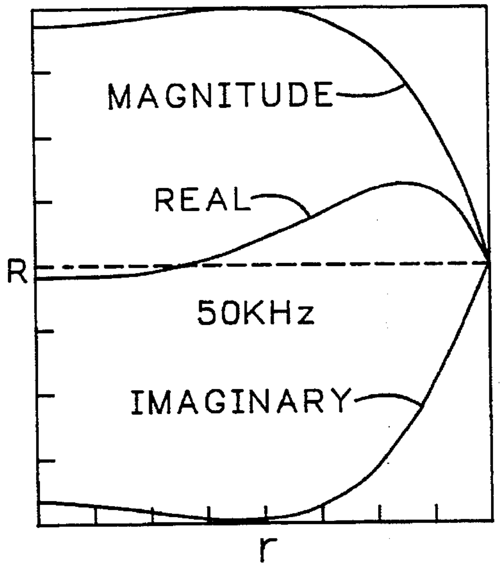
Figure 5F:
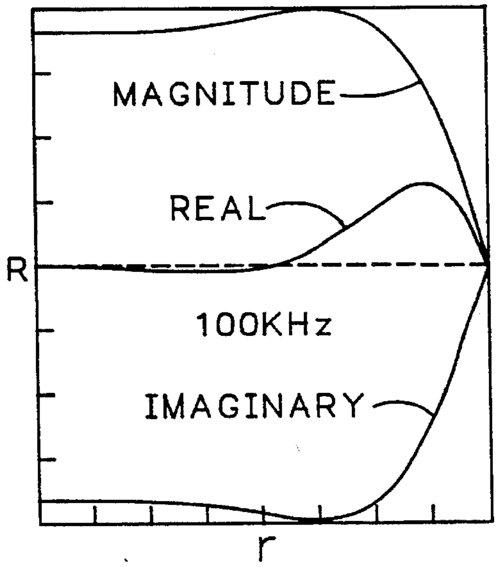

FIG. 4 graphically shows a calculated radial mode shape corresponding to modes one, two, and three shown in FIG. 3. Data were calculated using the equations:

$R_1(r)=J_0(k_1r)$, $R_2(r)=J_0(k_2r)$, $R_3(r)=J_0(k_3r)$, where $J_0$ is a Bessel function of the first kind and of the zeroth order.

The foregoing analysis illustrates the basic surface modes neglecting viscous behavior effects in the orifice. When viscous orifice flow is considered, a simplified governing equation for mode shape is:

$$\frac{\partial u}{\partial t} - \frac{\nu}{r}\frac{\partial}{\partial r}\left(r\frac{\partial u}{\partial r}\right) = -\frac{1}{\rho}\frac{\partial p}{\partial x}$$

Assuming a periodic driving pressure wave with a frequency $\omega=2\pi f$, the radial mode shape R is determined by calculating the following complex Bessel differential $$j\omega R - \frac{\nu}{r}\frac{\partial}{\partial r}\left(r\frac{\partial R}{\partial r}\right) = 1$$

FIGS. 5A–5F graphically show the resulting real and imaginary components of the mode shape at various frequencies. The following are several phenomena which are noteworthy: 1) Phase shift of the primary response between 1 and 20 kilohertz, 2) overshoot in the real response above 20 kilohertz, and 3) center modes in both the real and imaginary responses above 35 kilohertz.

Figure 6A:
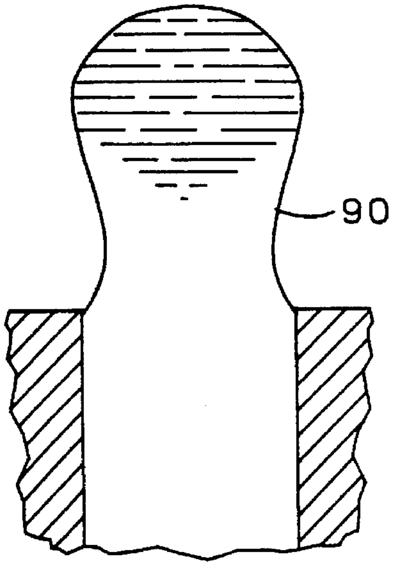
FIGS. 6A and 6B are diagrammatical cross-sectional views showing, at two instants in time, computer simulations of operational mode zero (large) ink drop being formed in an orifice.
Figure 6B:
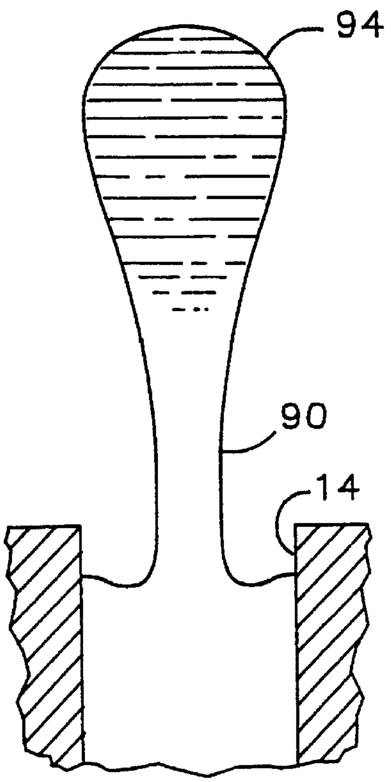
Figure 7A:
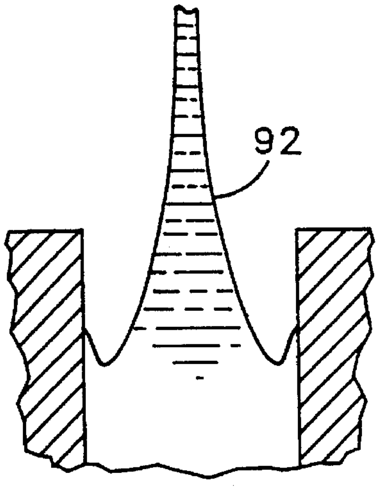
FIGS. 7A and 7B are diagrammatical cross-sectional views showing, at two instants in time, computer simulations of operational mode two (small) ink drop being formed in an orifice.
Figure 7B:
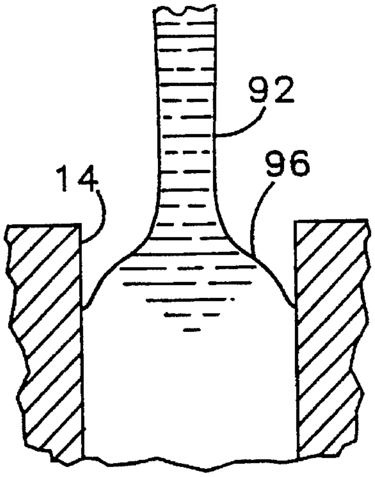

The separate analyses of the internal and surface dynamics identify the orifice flow modes used to provide dot volume modulation. FIGS. 6 and 7 are Navier-Stokes simulation plots generated using FLOW3D computational fluid dynamics software manufactured by Flow Science, Inc., of Los Alamos, N. Mex. FIGS. 6 and 7 show orifice flow and drop formation occurring in response to transducer drive waveforms exciting respective modes zero and two. FIG. 6B shows that mode zero excitation generates an ink ejection column 90 having a diameter significantly larger than a mode two ink ejection column 92 shown in FIGS. 7A and 7B. FIG. 6B shows a large ink drop 94 forming that has a diameter about the same as that of orifice 14. FIG. 7B shows a bulging meniscus 96 indicative of residual mode zero energy of an amount insufficient to eject a large drop from orifice 14.

Figure 8A:
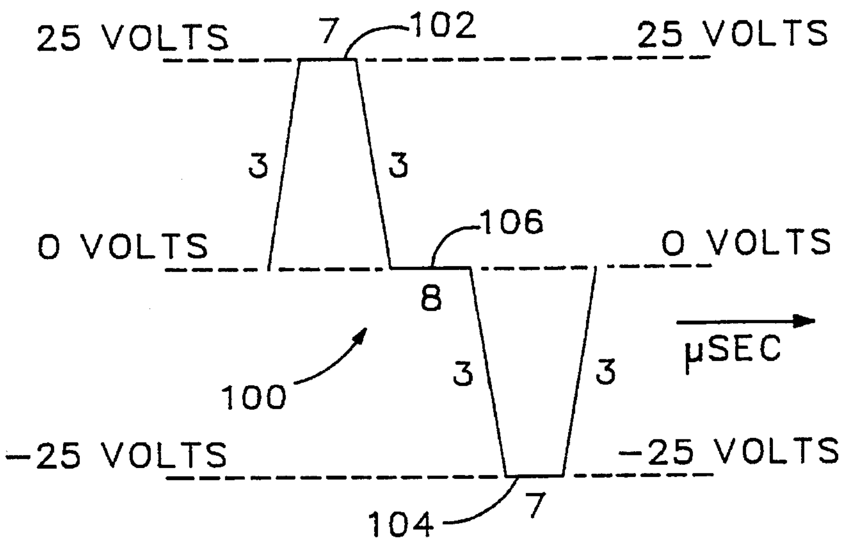
FIGS. 8A, 8B, and 8C are waveform diagrams showing the electrical voltage and timing relationships of PZT drive waveforms used to produce large, medium, and small volume (respective operational modes 0, 1, and 2) ink drops in a manner according to this invention.
Figure 8B:
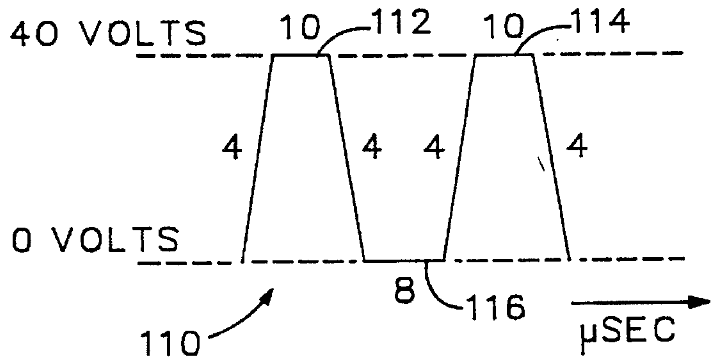
Figure 8C:
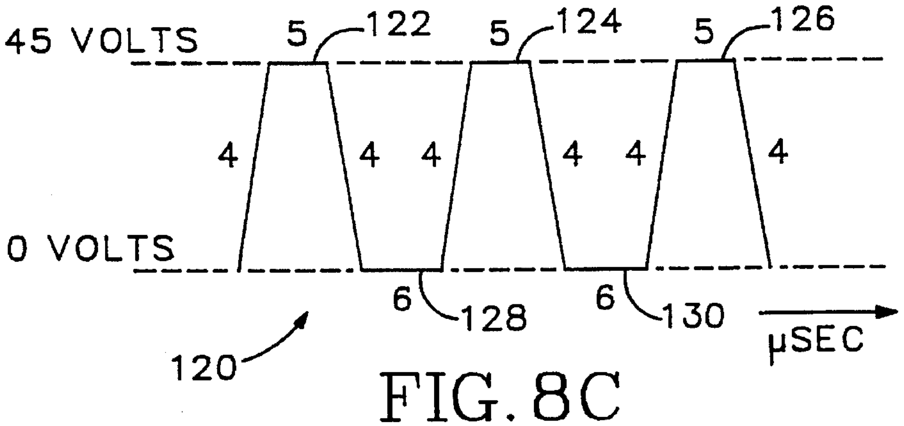

The foregoing theory has been applied in practice to the ink jet of FIG. 1. FIGS. 8A, 8B, and 8C show respective typical electrical waveforms generated by transducer driver 36 (FIG. 1) that concentrate energy in the frequency range of each of the different modes, while suppressing energy in other competing modes.

FIG. 8A shows a bi-polar waveform 100 suitable for exciting mode zero. Waveform 100 has a plus 25 volt seven microsecond pulse component 102 and a negative 25 volt seven microsecond pulse component 104 separated by an eight microsecond wait period.106. All rise and fall times of pulse components 102 and 104 are three microseconds. Waveform 100 causes the ejection from orifice 14 of a mode zero generated ink drop.

FIG. 8B shows a double-pulse waveform 110 suitable for exciting mode one. Waveform 110 has a pair of plus 40 volt ten microsecond pulse components 112 and 114 separated by an eight microsecond wait period 116. All rise and fall times of pulse components 112 and 114 are four microseconds. Waveform 110 causes the ejection from orifice 14 of a mode one generated ink drop having one-third the volume of the mode zero ink drop. The mode one ink drop prints on a print medium a dot having a diameter about 60 percent of a mode zero printed dot.

FIG. 8C shows a triple-pulse waveform 120 suitable for exciting mode two. Waveform 120 has three plus 45 volt five microsecond pulse components 122, 124, and 126 separated by six microsecond wait periods 128 and 130. All rise and fall times of pulse components 122, 124, and 126 are four microseconds. Waveform 120 causes the ejection from orifice 14 of a mode two generated ink drop having one-sixth the volume of the mode zero ink drop. The mode two ink drop prints on the print medium a dot having a diameter about 40 percent of the mode zero printed dot.

Figure 9A:
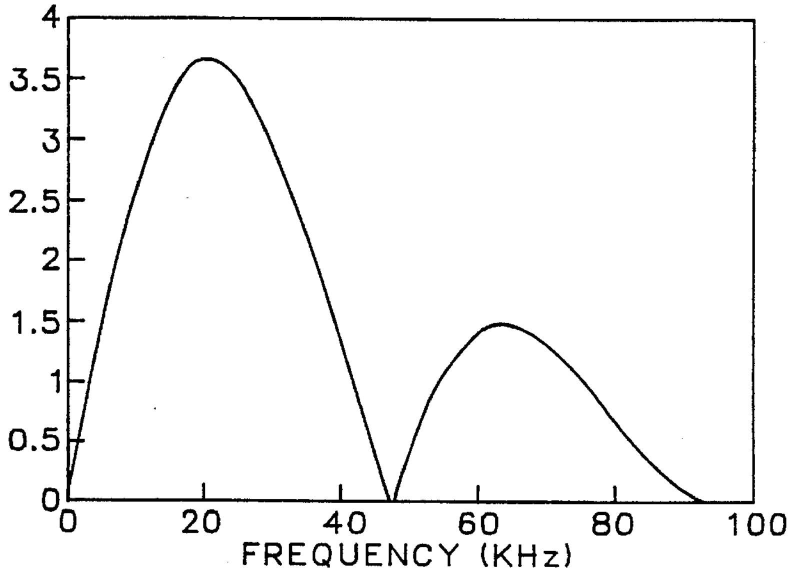
FIGS. 9A, 9B, and 9C graphically show spectral energy as a function of frequency of the PZT drive waveforms shown respectively in FIGS. 8A, 8B, and 8C.
Figure 9B:
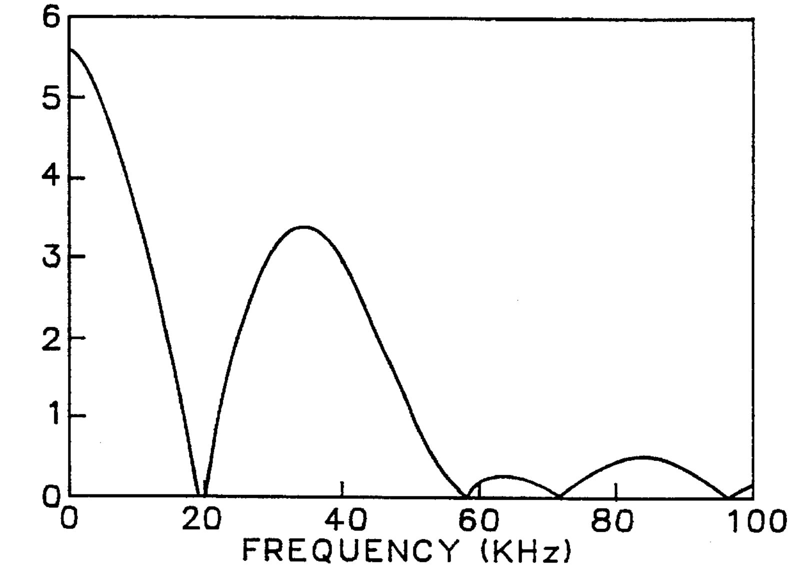
Figure 9C:
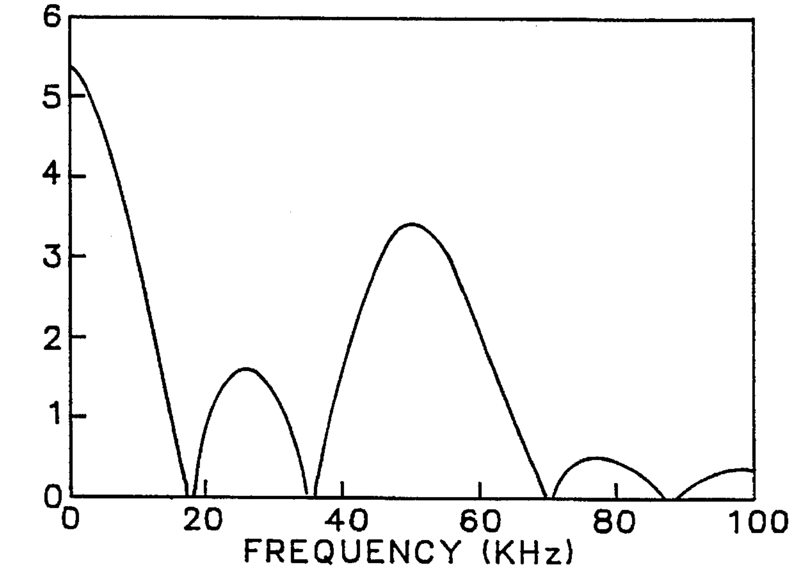

FIGS. 9A, 9B, and 9C show the time-domain spectral energy distribution of respective waveforms 100, 110, and 120. In particular, FIG. 9A shows waveform 100 energy concentrated just above 18 kilohertz, the frequency required to excite mode zero. FIG. 9B shows waveform 110 energy concentrated near 32 kHz, the frequency required to excite mode one. However, waveform 110 energy is minimized at about 18 kilohertz to suppress excitation of mode zero. FIG. 9C shows waveform 120 energy concentrated near 50 kilohertz, the frequency required to excite mode two. However, waveform 120 energy is minimized at about 18 and about 35 kilohertz to suppress excitation of modes zero and one.

Figure 10:
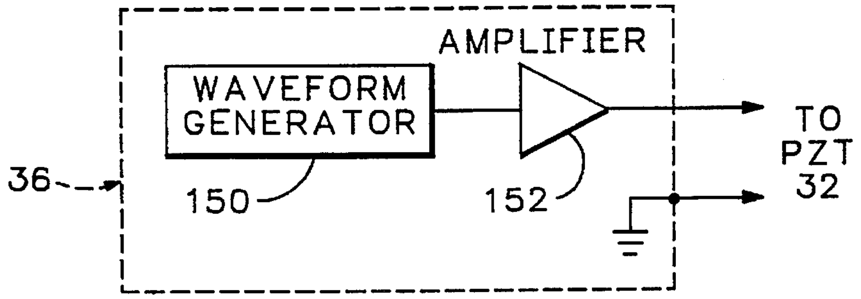
FIG. 10 is a schematic block diagram showing the electrical interconnection of apparatus used to generate the PZT drive waveforms of FIGS. 8A, 8B, and 8C.

FIG. 10 diagrammatically shows apparatus representative of transducer driver 36 (FIG. 1) that is suitable for generating waveforms 100, 110, and 120 of FIG. 8. Any suitable commercial waveform generator can be employed. A waveform generator 150 is electrically connected to a voltage amplifier 152 that provides an output signal suitable for driving metal film layers 34 of transducer 32.

Figure 11A:
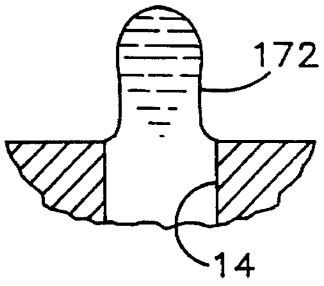
FIGS. 11A, 11B, and 11C are enlarged photographic views taken respectively at three instants in time of a large volume ink drop being ejected from an orifice in a manner according to this invention.
Figure 11B:
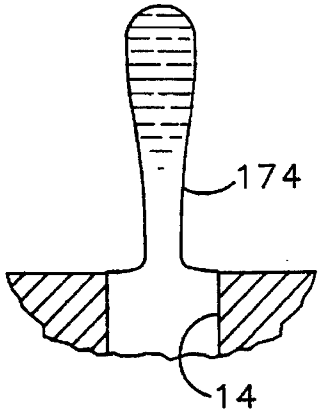
Figure 11C:
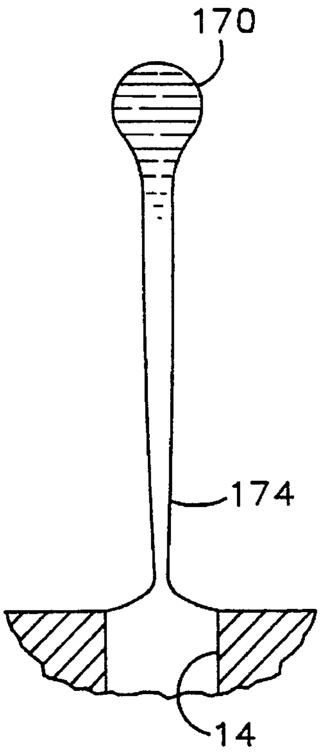

FIGS. 11A, 11B, and 11C show a time progression of the development of a mode zero ink drop 170 from orifice 14 of ink jet 10 obtained by photographing a video stillframe image of an actual drop. FIG. 11A shows a mode zero bulk flow 172 having a diameter defined by orifice 14, emerging from orifice 14 to begin generating drop 170. FIG. 11B shows the bulk flow retracting into orifice 14 as a tail 174 develops. FIG. 11C shows large drop 170 of nearly developed and tail 174 starting to break off from orifice 14. The actual mode zero drop development compares closely with the simulated mode zero drop development shown in FIGS. 6A and 6B.

Figure 12A:
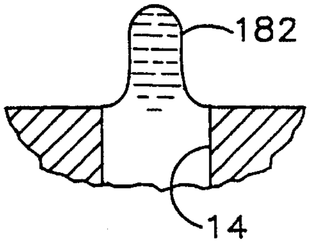
FIGS. 12A, 12B, and 12C are enlarged photographic views taken respectively at three instants in time of a medium volume ink drop being ejected from an orifice in a manner according to this invention.
Figure 12B:
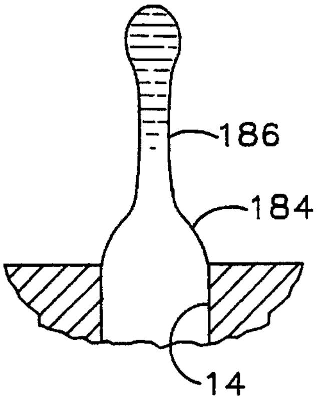
Figure 12C:
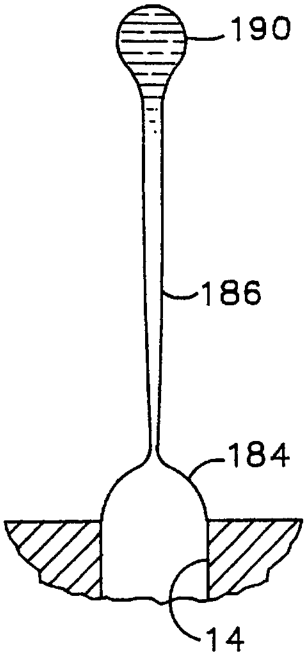

FIGS. 12A, 12B, and 12C show a time progression of the development of a mode one ink drop 180 from orifice 14 of ink jet 10 obtained by photographing a video stillframe image of an actual drop. FIG. 12A shows a mode one flow 182 having a diameter smaller than orifice 14, emerging from orifice 14 to begin generating drop 180 of FIG. 12C. FIG. 12B shows an orifice diameter bulge 184 emerge from orifice 14 as a tail 186 develops. Bulge 184 indicates the presence of residual zero mode energy. FIG. 12C shows mode one drop 180 nearly developed and tail 186 starting to break off from bulge 184. As described with reference to FIG. 7, there is insufficient energy for bulge 184 to form a large drop.

Figure 13A:
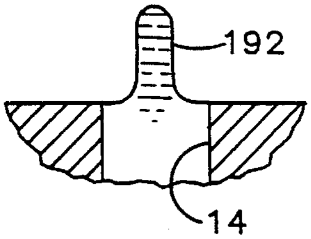
FIGS. 13A, 13B, and 13C are enlarged photographic views taken respectively at three instants in time of a small volume ink drop being ejected from an orifice in a manner according to this invention.
Figure 13B:
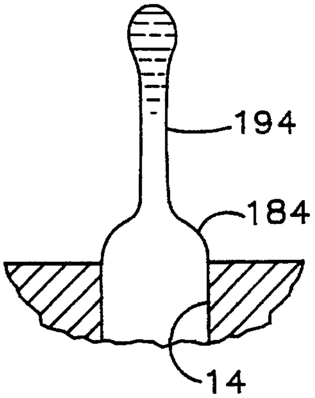
Figure 13C:
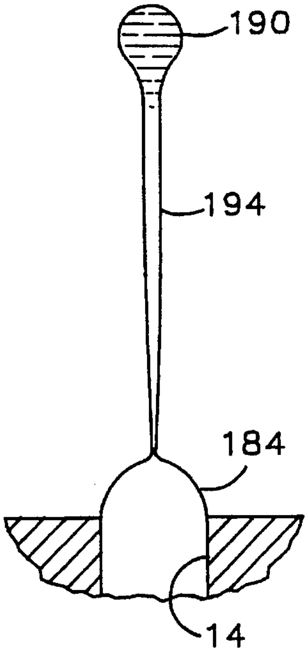

FIGS. 13A, 13B, and 13C show a time progression of the development of a mode two ink drop 190 of FIG. 13C from orifice 14 of ink jet 10 obtained by photographing a video stillframe image of an actual drop. FIG. 13A shows a mode two flow 192 having a diameter smaller than orifice 14, emerging from orifice 14 to begin generating drop 190. Mode two flow 192 has a smaller diameter than mode one flow 182, which indicates the presence of higher order mode excitation energy. FIG. 13B shows the orifice diameter bulge 184 again emerging from orifice 14 as a tail 194 develops. Again, the presence of bulge 184 indicates the presence of residual zero mode energy. FIG. 13C shows mode two drop 190 nearly developed and tail 194 starting to break off from bulge 184. In a manner similar to mode one drop formation, there is insufficient energy for bulge 184 to form a large drop. The actual mode two drop development compares closely with the simulated mode two drop development shown in FIGS. 7A and 7B.

Table 2 shows experimental data comparing the drop volume, printed dot size, transit time (time to a print medium spaced about 0.81 millimeter from orifice 14), and drop ejection velocity.

TABLE 2

| | Mode 0 Drops | Mode 1 Drops | Mode 2 Drops | Units |
|---|---|---|---|---|
| Drop volume | 126.2 | 46.4 | 23.8 | picoliters |
| Dot diameter | 130 | 84 | 64 | microns |
| Transit time | 213 | 219 | 219 | microsec |
| Drop velocity | 3.8 | 3.7 | 3.7 | meters/sec |

The transit time for the different drop sizes is substantially the same, demonstrating the ability to produce drops of different sizes having sufficient initial kinetic energy to produce equivalent velocities. The drop velocities are sufficient to ensure drop landing accuracy and high-quality dot formation.

An unexpected result observed while gathering experimental data was the relative independence of drop volume and drop ejection velocity. Changing the amplitude of drive waveforms 100, 110, and 120 around their preferred amplitudes changed the drop ejection velocity without changing the drop volume. This result provides a degree of adjustment useful for matching the ejection velocities of the different drop volumes. It also demonstrates the dominant role of mode shape in determining drop volume.

The data shown in Table 2 were gathered using the ink jet 10 of FIG. 1 driven at a drop repetition rate of two kilohertz. Ink jet 10 is a single representative jet of an color ink jet array print head. Ink jet 10 has the dimensions shown in Table 1 but is merely representative of a typical PZT driven ink jet print head suitable for use with the invention.

A drop repetition rate approaching ten kilohertz is possible by using a more optimized ink jet design. Such an ink jet design should eliminate internal resonant frequencies close to those required to excite orifice resonance modes needed for drop volume modulation. Drop volume modulation can be obtained with properly optimized ink jet designs to satisfy commercial printing purposes at drop repetition rates at least as high as about 20 kilohertz.

Alternative embodiments of portions of this invention include, for example, its applicability to jetting various fluid types including, but not limited to aqueous and phase-change inks of various colors.

Likewise, skilled workers will recognize that the invention is useful for exciting modes higher than modes one, two, and three described herein and is not limited to exciting those modes in a cylindrical orifice.

Skilled workers will realize that waveforms other than waveforms 100, 110, and 120 can achieve the desired results, and that a spectrum analyzer may be used to view a resulting energy spectrum while shaping a waveform intended to excite a particular orifice resonance mode in a desired orifice geometry, fluid type, and transducer type.

It should be noted that this invention is useful in combination with various prior art techniques including dithering and electric field drop acceleration to provide enhanced image quality and drop landing accuracy.

In summary, the invention is amenable to any fluid jetting drive mechanism and architecture capable of providing the required drive waveform energy distribution to a suitable orifice and its fluid meniscus surface.

It will be obvious to those having skill in the art that many changes may be made to the details of the above-described embodiments of this invention without departing from the underlying principles thereof. For example, electromechanical transducers other than the PZT bending-mode type described may be used. Shear-mode, annular constrictive, electrostrictive, electromagnetic, and magnetostrictive transducers are suitable alternatives. Similarly, although described in terms of electrical energy waveforms to drive the transducers, any other suitable energy form could be used to actuate the transducer, such as, but not limited to, acoustical or microwave energy. Where electrical waveforms are employed, the waveforms can equally well be established by unipolar or bipolar pairs or groups of pulses. Accordingly, it will be appreciated that this invention is, therefore, applicable to fluid drop size modulation applications other than those found in ink jet printers. The scope of the present invention should be determined, therefore, only by the following claims.

What is claimed is:

1. Apparatus for ejecting a fluid from an orifice having an orifice diameter, comprising:

- a pressure chamber coupled to the orifice, the fluid forming a meniscus in the orifice; and
- a transducer driver generating a first energy input that actuates a transducer to excite in the meniscus a first center excursion size in response to the first energy input, the first energy input having a spectral energy distribution that excites the meniscus to eject a first drop of the fluid from the orifice, the first drop having a first drop diameter that is less than the orifice diameter and a first drop ejection velocity, and after the first drop of the fluid is ejected, the transducer driver generates a second energy input that actuates the transducer to excite in the meniscus a second center excursion size in response to the second energy input, the second energy input having a spectral energy distribution that excites the meniscus to eject a second drop of the fluid from the orifice, the second drop having a second drop diameter different than the first drop diameter and a second drop ejection velocity that is substantially equal to the first drop ejection velocity.

2. The apparatus of claim 1 wherein the first energy input is a first electrical waveform and the second energy input is a second electrical waveform.

3. The apparatus of claim 2 in which the first center excursion size is excited by a meniscus oscillation mode having an order higher than a bulk displacement mode, and the spectral energy distribution of the first electrical waveform is established by a unipolar group of pulses.

4. The apparatus of claim 9 in which the first and second center excursion sizes are each excited by a different meniscus resonance oscillation mode.

5. The apparatus of claim 2 in which the transducer driver includes a processor that causes selective generation of the first and second electrical waveforms such that the ejected drop diameter is controlled from drop to drop at a drop ejection rate having a range from at least about 10,000 drops per second to about 20,000 drops per second.

6. The apparatus of claim 2 in which the spectral energy distribution of the first and second electrical waveforms is such that a spectral energy content of the electrical waveforms is concentrated around a desired orifice resonant frequency and suppressed at an undesired orifice resonant frequency.

7. The apparatus of claim 1 in which the first and second energy inputs are electrical waveforms that each have an adjustable amplitude that causes ejection from the orifice of the first and second drops at the substantially equal first and second drop ejection velocities.

8. The apparatus of claim 1 in which the transducer is of the piezoelectric type.

9. The apparatus of claim 1 in which the orifice is an ink jet orifice and the fluid is ink.

10. The apparatus of claim 9 in which the orifice diameter is in a range of from about 25 to about 150 microns.

11. The apparatus of claim 9 further including an ink manifold and a pressure chamber in which the ink manifold, the pressure chamber, and the ink jet orifice are coupled by channels that are sized to avoid a parasitic resonance at a meniscus center excursion exciting frequency.

12. A method for ejecting a fluid from an orifice having an orifice diameter, comprising the steps of:

forming a meniscus in the orifice;

generating a first energy input;

exciting in the meniscus a first center excursion size in response to the first energy input;

shaping the first energy output such that the meniscus is sufficiently excited to eject at least a first drop of the fluid from the orifice, the first drop having a first drop diameter and a first drop ejection velocity;

generating a second energy input;

exciting in the meniscus a second center excursion size in response to the second energy input; and shaping the second energy input such that the meniscus is sufficiently excited to eject a second drop of the fluid from the orifice, the second drop having a second drop diameter different than the first drop diameter, and a second drop ejection velocity that is substantially the same as the first drop ejection velocity.

13. The method according to claim 12 in which the first energy input is a first electrical waveform.

14. The method of claim 13 in which the exciting in the meniscus the first center excursion size step further includes exciting the meniscus in a meniscus oscillation mode having an order higher than a bulk displacement mode.

15. The method according to claim 14 in which the shaping of the first center excursion size of the meniscus includes forming the first electrical waveform with a unipolar group of pulses.

16. The method of claim 13 in which the shaping step further includes the steps of:

concentrating a spectral energy of the first electrical waveform around a frequency that excites the first center excursion size; and suppressing the spectral energy of the first electrical waveform at frequencies that excite other than the first center excursion size.

17. The method of claim 13 in which the second energy input is a second electrical waveform.

18. The method of claim 17 in which the second center excursion size is excited by a bulk displacement mode and the shaping step entails forming the second electrical waveform with a bipolar pair of pulses that are spaced apart by a wait period.

19. The method of claim 17 in which the shaping the second electrical waveform step further includes adjusting an amplitude of the second electrical waveform to cause the second drop ejection velocity to be substantially the same as the first drop ejection velocity.

20. The method of claim 13 in which the first and second center excursion sizes are each excited by a different meniscus resonance oscillation mode.

21. The method of claim 12 in which the first drop diameter is less than the orifice diameter.

22. A method of determining a desired oscillation mode for exciting a meniscus of liquid ink in a liquid ink jet orifice comprising the steps of:

(a) selecting an energy input form communicable to the liquid ink to concentrate spectral energy distribution at frequencies near the natural frequency of the orifice and near the natural frequency of the orifice and the meniscus at the desired oscillation mode; and (b) suppressing energy at the natural frequency of other oscillation modes and parasitic resonant frequencies that compete with the desired oscillation mode for energy.

23. The method of claim 22 in which the energy input is a waveform.

24. The method of claim 23 in which the waveform is an electrical waveform.

25. The method of claim 24 in which the electrical waveform modulates the volume of liquid in the meniscus forming an ejected liquid ink drop.

26. The method of claim 25 in which the electrical waveform drives a transducer, inducing pressure waves in the liquid ink to excite ink fluid flow resonances in the orifice and at the meniscus.

27. The method of claim 26 in which each selected waveform excites a different resonance frequency and ejects a different ink drop volume from the orifice.

28. The method of claim 27 in which orifice has a diameter.

29. The method of claim 28 in which the ink drop ejected from the orifice is smaller than the diameter of the orifice.

30. The method of claim 22 wherein gray scale printing is achieved by exciting the meniscus of liquid ink to eject the ink from the orifice a plurality of times to impact on a receiving surface at a plurality of locations.

31. A method of controlling a drop diameter of an ink drop ejected from an orifice of a liquid ink jet printer, the orifice having an orifice diameter, comprising the steps of:

(a) selecting an energy input form communicable to the liquid ink via a transducer to induce pressure waves in the ink that excite ink fluid flow resonances in the orifice and at a corresponding ink surface meniscus; and (b) ejecting a liquid ink drop from the orifice in response to each resonance, each of the ink drops having a substantially equal ejection velocity and a separate and distinct drop diameter in response to each resonance, at least one of the drop diameters being less than the orifice diameter.

32. The method of claim 31 in which the energy input is a waveform.

33. The method of claim 32 in which the waveform is an electrical waveform.

34. The method of claim 33 in which the electrical waveform induces resonances by concentrating spectral energy distribution at frequencies near the natural frequency of the orifice and the meniscus.

35. The method according to claim 31 wherein a plurality of ink drops are ejected to impact on a receiving surface at a plurality of locations to achieve gray scale printing.

* * * * *